United States Patent
Yumoto et al.

(10) Patent No.: US 7,740,986 B2
(45) Date of Patent: *Jun. 22, 2010

(54) BATTERY HAVING ELECTROLYTE WITH ORGANOBORATE ADDITIVE

(75) Inventors: Hiroyuki Yumoto, Stevenson Ranch, CA (US); Nelly Bourgeon, Santa Clarita (FR); Taison Tan, Glendora, CA (US); Phuong-Nghi Lam, Glendale, CA (US)

(73) Assignee: Quallion LLC, Sylmar, CA (US)

(*) Notice: Subject to any disclaimer, the term of this patent is extended or adjusted under 35 U.S.C. 154(b) by 1435 days.

This patent is subject to a terminal disclaimer.

(21) Appl. No.: 11/061,973

(22) Filed: Feb. 17, 2005

(65) Prior Publication Data

US 2007/0065726 A1 Mar. 22, 2007

Related U.S. Application Data

(63) Continuation-in-part of application No. 10/984,434, filed on Nov. 8, 2004, and a continuation-in-part of application No. 10/719,276, filed on Nov. 20, 2003, now abandoned, application No. 11/061,973, which is a continuation-in-part of application No. 10/718,981, filed on Nov. 20, 2003, application No. 11/061,973, which is a continuation-in-part of application No. 10/931,740, filed on Sep. 1, 2004, now abandoned, which is a continuation of application No. 10/335,168, filed on Dec. 31, 2002, now Pat. No. 6,787,268.

(60) Provisional application No. 60/429,947, filed on Nov. 27, 2002, provisional application No. 60/456,606, filed on Mar. 20, 2003, provisional application No. 60/408,100, filed on Sep. 3, 2002.

(51) Int. Cl.
*H01M 10/568* (2006.01)

(52) U.S. Cl. .................. 429/324; 429/326; 429/332; 429/337; 429/338

(58) Field of Classification Search ........... 429/219, 429/324, 326, 332, 337, 338, 231.5, 231.7
See application file for complete search history.

(56) References Cited

U.S. PATENT DOCUMENTS

| | | | |
|---|---|---|---|
| 6,692,865 B2 * | 2/2004 | Gan et al. | 429/128 |
| 6,787,268 B2 * | 9/2004 | Koike et al. | 429/332 |
| 7,226,704 B2 * | 6/2007 | Panitz et al. | 429/332 |
| 2002/0136950 A1 * | 9/2002 | Gan et al. | 429/212 |
| 2007/0065727 A1 * | 3/2007 | Koike et al. | 429/326 |

FOREIGN PATENT DOCUMENTS

DE 101 11 410 C1 * 7/2002

* cited by examiner

*Primary Examiner*—Stephen J. Kalafut
(74) *Attorney, Agent, or Firm*—Gavrilovich Dodd & Lindsey, LLP

(57) ABSTRACT

The battery has an electrolyte that includes an organoborate additive and one or more salts in a solvent. The organoborate additive can be present in a concentration less than 0.2 M or less than 0.05 M. A molar ratio of the organoborate additive: one or more salts is in a range of 4:1 to 400:1. In some instances, the solvent includes one or more organic solvents.

48 Claims, 3 Drawing Sheets

BATTERY HAVING ELECTROLYTE WITH ORGANOBORATE ADDITIVE

REFERENCE TO PRIOR FILED APPLICATIONS

This application is a continuation-in-part of U.S. patent application Ser. No. 10/984,434, filed on Nov. 8, 2004, and entitled "Battery Having High Rate and High Capacity Capabilities;" and of U.S. patent application Ser. No. 10/719,276, filed on Nov. 20, 2003, and entitled "Improved Primary Battery," now abandoned, which claims the benefit of U.S. Provisional Patent Application Ser. No. 60/429,947, filed on Nov. 27, 2002, and entitled "Improved Primary Battery;" and this application is a continuation-in-part of U.S. patent application Ser. No. 10/718,981, filed on Nov. 20, 2003, and entitled "Primary Battery Having Sloped Voltage Decay" which claims the benefit of U.S. Provisional Patent Application Ser. No. 60/456,606, filed on Mar. 20, 2003, and entitled "Primary Battery Having Sloped Voltage Decay;" and this application is a continuation-in-part of U.S. patent application Ser. No. 10/931,740, filed on Sep. 1, 2004, entitled "Electrolyte," now abandoned, which is a continuation of U.S. patent application Ser. No. 10/335,168, filed on Dec. 31, 2002, issued as U.S. Pat. No. 6,787,268, and entitled "Electrolyte" which claims the benefit of U.S. Provisional Patent Application Ser. No. 60/408,100, filed on Sep. 3, 2002, and entitled "Electrolyte;" and this application claims the benefit of International Patent Application number PCT/US03/27025, filed Aug. 28, 2003, published in English as WO 2004/023577 A2, and entitled "Electrolyte;" each of which is incorporated by reference herein in its entirety.

TECHNICAL FIELD

This invention relates to batteries and more particularly to batteries having an electrolyte that includes an organoborate additive.

BACKGROUND

A variety of primary batteries employ electrolytes with organic solvents such as diethyl carbonate (DEC) and ethylene carbonate (EC). These batteries are often stored for extended periods of time before use. However, the performance of these batteries often drops after this storage. For instance, the capacity of these batteries often decreases after extended storage. Additionally, the pulsing capability of these batteries can drop after storage. For instance, the voltage drop that occurs during pulsing can increase after storage. Implantable cardioverter defibrillators (ICDs) are an example of a device that requires a battery with pulsing capabilities. An ICD uses these pulses to generate defibrillation shocks that are provided to a patient during a defibrillation event. An increased voltage drop can reduce the ability of the ICD to deliver these defibrillation shocks. As a result, there is a need for a battery with improved storage tolerance.

SUMMARY

A battery is disclosed. The battery has an electrolyte that includes an organoborate additive and one or more salts in a solvent. The organoborate additive can be present in a concentration less than 0.2 M or less than 0.05 M. A molar ratio of the organoborate additive:one or more salts is in a range of 10:1 to 400:1. In some instances, the solvent includes one or more organic solvents.

The organoborate can include one or more salts according to:

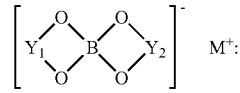

wherein $M^+$ is a metal ion selected from the Group I or Group II elements; $Y_1$ and $Y_2$ are each selected from a group consisting of: —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4.

Additionally or alternatively, the organoborate can include one or more salts according to:

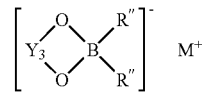

wherein $M^+$ is a metal ion selected from the Group I or Group II elements; $Y_3$ is selected from a group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$, or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4.

Specific examples of organoborates include, but are not limited to, bis[benzenediolato(2-)—O,O']borate, bis[substituted benzenediolato(2-)—O,O']borate, bis[salicylato]borate, bis[substituted salicylato]borate, bis[2,2'-biphenyldiolato(O,O')]borate, bis[substituted 2,2'-biphenyldiolato(O, O')]borate), bis[oxalato(2-)—O,O']borate, bis[malonato (2-)—O,O']borate, bis[succinato]borate, [.alpha.-hydroxy-carboxylato]borate, [.alpha.-hydroxy-carboxylato]borate, [.beta.-hydroxy-carboxylato]borate, [.beta.-hydroxy-carboxylato]borate, [.alpha.-dicarboxylato]borate, and [.alpha.-dicarboxylato]borate.

In some instances, the organoborate additive is one of a plurality of organoborate additives included in the electrolyte. The one or more organoborates can be selected to form a passivation layer on at least one of the one or more cathodes. Examples of organoborates suitable for forming a passivation layer on an electrode include, but are not limited to, lithium bis(oxalato)borate (LiBOB) and/or lithium difluoro oxalato borate (LiDfOB).

In some instances, the solvent includes at least one organic solvent selected from the group consisting of tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), and dipropyl carbonate, and at least one organic solvent selected from the group consisting of propylene carbonate (PC), ethylene carbonate (EC), butylene carbonate, acetonitrile, dimethyl sulfoxide, dimethyl formamide, dimethyl acetamide, γ-valerolactone, and γ-butyrolactone (GBL).

The one or more salts can be a lithium salt. Examples of lithium salts include, but are not limited to, $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, LiSCN, $LiO_2$, $LiO_3SCF_3$, $LiO_2CCF_3$, $LiSO_6F$, $LiB(C_6H_5)_4$, Li-methide, Li-imide and lithium alkyl fluorophosphates.

In some instances, the electrolyte activates a cathode that includes one or more active materials selected from the group consisting of $CF_x$, $CuCl_2$, $LiCuCl_2$, $MnO_2$, $V_2O_5$, lithium vanadium oxide, silver vanadium oxide, $TiS_2$, polypyrrole, $MoO_2$, $MoS_2$, $MnO_2$, $V_2O_5$, and $V_6O_{13}$. In another example, the cathode includes one or more first active materials and one or more second active materials. Suitable first active materials include, but are not limited to, $CF_x$, $CuCl_2$, $LiCuCl_2$, $MnO_2$ and $V_2O_5$. In a preferred embodiment, the first active material includes or consists of $CF_x$. Suitable second active materials include, but are not limited to, lithium vanadium oxide, silver vanadium oxide, $TiS_2$, polypyrrole, $MoO_2$, $MoS_2$, $MnO_2$, $V_2O_5$, and $V_6O_{13}$. In a preferred embodiment, the cathode active materials consist of $CF_x$.

Defibrillators that employ the above batteries are also disclosed.

DETAILED DESCRIPTION

A battery is disclosed. The battery has an electrolyte activating one or more anodes and one or more cathodes. The electrolyte includes an organoborate additive and one or more salts in an organic solvent. Suitable organoborate additives include, but are not limited to lithium bis(oxalato)borate (LiBOB) and lithium difluoro oxalato borate (LiDfOB). These organoborate additives can form a passivation layer on the anode and/or on the cathode. When stored at elevated temperatures, batteries with this passivation layer have shown a reduced level of self-discharge when compared to batteries without this passivation layer. Storage at elevated temperatures for a period of time can simulate the effects of storage for a longer period of time at a lower temperature such as room temperature. As a result, the drop in self-discharge that occurs during storage at elevated temperatures indicates that the battery will likely have a reduced self-discharge when stored for extended periods of time.

Without being bound to theory, it is believed that high levels of self-discharge are responsible for the performance drop associated with the storage of prior batteries. The reduced level of self-discharge associated with the disclosed battery enhances the performance of the battery relative to prior batteries. For instance, the disclosed batteries can have a reduced level of capacity loss after storage at elevated temperatures. Additionally or alternately, the disclosed batteries can have a smaller voltage drop when pulsing after storage at elevated temperatures relative to prior batteries.

Figure 1:
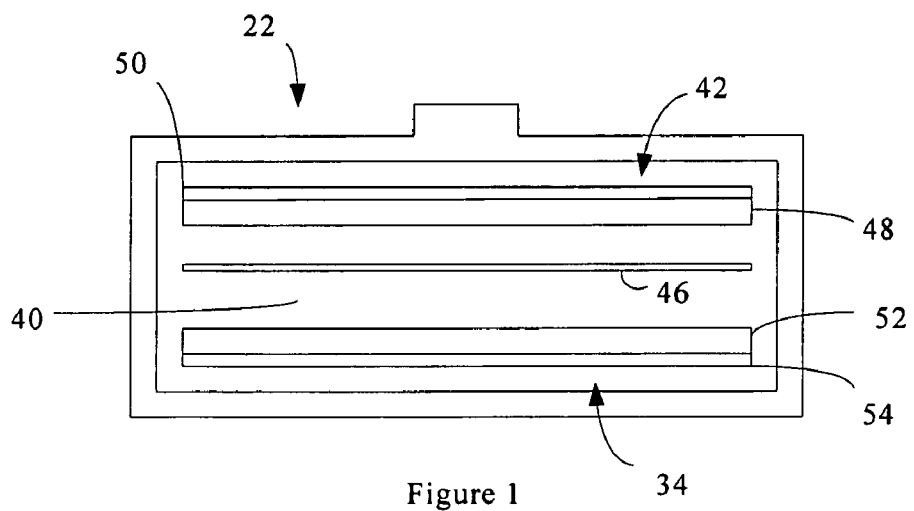
FIG. 1 is a schematic view of a battery.

FIG. 1 is a schematic view of a suitable battery 22. The battery 22 includes an electrolyte 40 activating a cathode 42 and an anode 34. A separator 46 separates the cathode 42 and anode 34. The cathode 42 includes a cathode medium 48 on a cathode substrate 50. The anode 34 includes an anode medium 52 on an anode substrate 54. Although the battery is illustrated as including one anode and one cathode, the battery can include more than one anode and/or more than one cathode with the anodes and cathodes each separated by a separator. Additionally, the battery can have a variety of different configurations such as stacked configuration, a "jelly-roll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

The electrolyte 40 includes one or more organoborate additives and one or more salts in a solvent. The solvent can be an organic liquid. The solvent can include or consist of one or more first organic solvents and/or one or more second organic solvents. In some instance, the first solvent is a low viscosity solvent and the second solvent is a high permittivity solvent. Examples of the first solvent include, but are not limited to, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof. Examples of second solvents include, but are not limited to, cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), and mixtures thereof. An example solvent includes a mixture of DME and PC. A preferred electrolyte includes one or more first solvents and one or more second solvents. Suitable volume ratios of the one or more first solvents to the one or more second solvents include, but are not limited to, ratios in a range of: 30:70 to 80:20. In a preferred example the ratio is in a range of 50:50 to 70:30.

Suitable salts for use with the electrolyte include, but are not limited to, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, LiSCN, $LiO_2$, $LiO_3SCF_3$, $LiO_2CCF_3$, $LiSO_6F$, $LiB(C_6H_5)_4$, Li-methide, Li-imide, lithium alkyl fluorophosphates, and mixtures thereof. Preferred salts include $LiPF_6$ and $LiBF_4$. The electrolyte can be prepared such that the salt has a concentration greater than 0.1 M, 0.5 M or greater than 0.7 M and/or less than 1.5 M, less than 2 M, or less than 5 M. For instance, the electrolyte can include 0.8 M to 1.5 M $LiAsF_6$ or $LiPF_6$ in a 50:50 mixture, by volume, of propylene carbonate and 1,2-dimethoxyethane. Another example of the electrolyte includes electrolyte 1.2 M $LiBF_4$ in a 30:70 by volume mixture of PC and DME.

The electrolyte includes one or more organoborate additives. Suitable organoborate additives include, but are not limited to lithium bis(oxalato)borate (LiBOB) and lithium difluoro oxalato borate (LiDfOB). These organoborate additives can form a passivation layer on an anode and/or on a cathode. In some instances, the concentration of the organoborate additives that form the passivation layer on anode and/or cathode does not substantially exceed the concentration needed to form the passivation layer(s). In some instances, an excess concentration of the organoborate salt can produce an excessively thick passivation layer that increases the internal resistance of the battery and/or increase voltage delay. Additionally, it is currently believed that an excess of organoborate salt in the electrolyte can reduce the electrolyte conductivity. Suitable concentration for a particular organoborate additive before discharge of the battery in the electrolyte includes, but is not limited to, concentrations greater than 0.005, greater than 0.001 M and/or less than 0.05 M, less than 0.2 M or less than 1.0 M. In a preferred embodiment, before discharge of the battery at least one organoborate is present in the electrolyte at a concentration of less than 0.1 M. A suitable concentration for the total amount of organborate additives in the electrolyte before discharge of the battery includes, but is not limited to, concentrations greater than 0.005, greater than 0.001 M and/or less than 0.05 M, less than 0.2 M or less than 1.0 M.

The total concentration of the organoborate additives in the electrolyte before discharge of the battery can be smaller than the total concentration of the non-organoborate. Before discharge of the battery or before formation of the passivation layer, a suitable molar ratio of the total concentration of the non-organoborate salts: total organoborate concentration ratios greater than 4:1, 10:1, 40:1, or 200:1 and/or less than 50:1, 100:1, 400:1 or 800:1. In some instances, the molar ratio is in a range of 50:1 to 200:1. The concentration of the one or more organoborate additives may be reduced after formation of the passivation layer because the one or more organoborate additives may be consumed during formation of the passivation layer. In some instances, the concentration of the organoborate additive(s) that form the passivation layer on anode and/or cathode substantially exceeds the concentration needed to form the passivation layer.

Suitable organoborate additives include lithium organoborate salts. The organoborate salt can be an aromatic bis[bidentate]borate, also known as a bis[chelato]borate, such as bis[benzenediolato(2-)-O,O']borate, bis[substituted benzenediolato(2-)-O,O']borate, bis[salicylato]borate, bis[substituted salicylato]borate, bis[2,2'-biphenyldiolato(O,O')]borate, and bis[substituted 2,2'-biphenyldiolato(O,O')]borate]. In some instances, the organoborate salt is a nonaromatic bis[chelato]borate, such as bis[oxalato(2-)-O,O']borate, bis[malonato(2-)—O,O']borate, bis[succinato]borate, [.alpha.-hydroxy-carboxylato]borate, [.alpha.-hydroxy-carboxylato] borate, [.beta.-hydroxy-carboxylato]borate, [.beta.-hydroxy-carboxylato]borate, [.alpha.-dicarboxylato]borate, and [.alpha.-dicarboxylato]borate. In some instances, the organoborate salt is a mono[bidentate]borate, a tridentate borate, or a tetradentate borate. Examples of suitable organoborate salt include lithium bis(tetrafluoroethylenediolato)borate LiB(OCF$_2$CF$_2$O)$_2$, lithium bis(hexafluoropropylenediolato) borate LiB[OCF(CF$_3$)CF$_2$O]$_2$ and lithium bis[1,2-tetrakis(trifluoromethyl)ethylenedialato(2-)O,O—']borate or lithium bis(perfluoropinacolato)borate LiB[OC(CF$_3$)$_2$C (CF$_3$)$_2$O]$_2$ or LiB[OC(CF$_3$)$_2$]$_4$. Preferred lithium organoborate salts are lithium bis-oxalato borate (LiBOB), and lithium difluoro oxalato borate (LiDfOB).

Examples of suitable organoborate salts are disclosed in U.S. patent application Ser. No. 60/565,211, filed on Apr. 22, 2004, entitled "Organoborate Salt in Electrochemical Device Electrolytes" and incorporated herein in its entirety.

One example of the organoborate salt includes: a boron linked directly to at least two oxygens and an organic moiety linking two of the oxygens. In some instances, the boron is also linked directly to two halogens. Another example of the organoborate salt includes: a boron linked directly to each of four oxygens; a first organic moiety linking two of the oxygens; and a second organic moiety linking the other two oxygens. The first organic moiety and the second organic moiety can be the same or different. The first organic moiety and/or the second organic moiety can be: substituted or unsubstituted; and/or branched or unbranched; and/or saturated or unsaturated. The backbone of an organic moieties extending between the boron linked oxygens can include only carbons or can include carbons and one or more oxygens. In some instances, one or both of the organic moieties are halogenated. In one example, the first organic moiety and/or the second organic moiety is fluorinated.

An example of the organoborate salt is represented by the following Formula II:

$$\left[ Y_1 \underset{O}{\overset{O}{\diagdown}} B \underset{O}{\overset{O}{\diagdown}} Y_2 \right]^- M^+:$$

wherein M$^+$ is a metal ion selected from the Group I or Group II elements; Y$_1$ and Y$_2$ are each selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4. M$^+$ is preferably selected from Group I and is most preferably lithium. Y$_1$ and Y$_2$ can be the same or different. Z and Z' can be the same or different. The R' can be the same or different and the R can be the same or different.

In an example of an organoborate salt according to Formula II, Y$_1$ and Y$_2$ are each —CX(CR$_2$)$_a$CX—; each X is =O and each R is hydrogen. In another example of the organoborate salt, Y$_1$ and Y$_2$ are each —CX(CR$_2$)$_a$CX—; each X is =O and each R is a halogen. In another example of the organoborate salt, Y$_1$ and Y$_2$ are each —CX(CR$_2$)$_a$CX—; each X is =O and each R is fluoro.

In a preferred example of an organoborate salt according to Formula II, Y$_1$ and Y$_2$ are each —CZZ'(CR$_2$)$_a$CZZ'—; each of the R' is hydrogen and each of the R are hydrogen. In another preferred example, Y$_1$ and Y$_2$ are each —CZZ'(CR$_2$)$_a$CZZ'—; each of the R' is halogen and each of the R are halogens. In another preferred example, Y$_1$ and Y$_2$ are each —CZZ'(CR$_2$)$_a$CZZ'—; each of the R' is fluorine and each of the R are fluorine.

Another example of the organoborate salt is represented by the following Formula III:

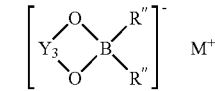

wherein M$^+$ is a metal ion selected from the Group I or Group II elements; Y$_3$ is selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4. M$^+$ is preferably selected from Group I and is most preferably lithium. Z and Z' can be the same or different. The R" can be the same or different. The R' can be the same or different. The R can be the same or different.

In an example of an organoborate salt according to Formula III, $Y_3$ is $-CX(CR_2)_aCX-$; each X is $=O$ and each R" is a halogen. In another example of the organoborate salt, $Y_3$ is $-CX(CR_2)_aCX-$ and each R" is a fluorine.

Suitable separators 46 include, but are not limited to, polyethylene, fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, polytetrafluoroethylene membrane, polypropylene/polyethylene membrane commercially available under the designation CELGARD (Celanese Plastic Company, Inc.), and a polyethylene membrane commercially available from Tonen Chemical Corp.

A suitable material for the anode substrate includes, but is not limited to, titanium, a titanium alloy, stainless steel, nickel, copper, tungsten, tantalum or alloys thereof.

The anode medium 52 includes or consists of one or more anode active materials and a binder. The anode active material can include or consist of a metal selected from Groups IA, IIA and IIIB of the Periodic Table of the Elements. Examples of these anode active materials include lithium, sodium, potassium, etc., and their alloys and intermetallic compounds including, for example, Li—Si, Li—Al, Li—B and Li—Si—B alloys and intermetallic compounds. Alternative suitable anode active materials include lithium alloys such as a lithium-aluminum alloy. The greater the amounts of aluminum present by weight in the alloy, however, the lower the energy density of the cell. Other alternative suitable anode active materials include graphite or other carbon, $Cu_6Sn_5$, $Cu_2Sb$, MnSb, other metal alloys, $Li_4Ti_5O_{12}$, silica alloys, or mixtures of suitable anode active materials.

In some instances, the anode consists of the anode medium. Accordingly, the anode medium can serve as the anode. For instance, the anode can include or consist of lithium metal or a lithium metal alloy. Lithium metal can be sufficiently conductive that an anode substrate is not necessary.

Suitable cathode substrates 50 include, but are not limited to, stainless steel, titanium, tantalum, platinum, aluminum, gold, nickel, or an alloy thereof.

The cathode medium 48 includes or consists of a plurality of cathode active materials and one or more binders. Suitable binders include, but are not limited to, carboxymethyl cellulose (CMC), fluoropolymer, polytetrafluoroethylene or polyvinylidene fluoride. In some instances, the cathode medium includes a conductive diluent to further increase conductivity if needed. Suitable diluents include, but are not limited to, acetylene black, carbon black and/or graphite or metallic powders such as powdered nickel and aluminum. In some instances, the cathode medium excludes a conductive diluent.

Suitable cathode active materials include, but are not limited to, fluorinated carbon ($CF_x$), lithium vanadium oxide such as the lithium vanadium oxide represented by $Li_{1+y}V_3O_8$, polypyrrole, $H_2V_3O_8$, metal vanadium oxides represented by $M_zH_{1-z}V_3O_8$, $CuCl_2$, silver vanadium oxides such as $Ag_2V_4O_{11}$, $LiCuCl_2$, $TiS_2$, $MoO_2$, $MoS_2$, $MnO_2$, $V_2O_5$, $V_6O_{13}$, $H_2V_3O_8$, $LiCoO_2$, $LiNiO_2$, $LiMnO_2$, $LiCoNiMnO_2$, $LiCoNiM'O_2$, and combinations thereof. In some instances, the cathode active materials include or consists of one or more first active materials and one or more second active materials. Suitable first active materials include, but are not limited to, $CF_x$, $CuCl_2$, $LiCuCl_2$, $MnO_2$ and $V_2O_5$. In an example, the first active material includes or consists of $CF_x$. Suitable second active materials include, but are not limited to, lithium vanadium oxide such as the lithium vanadium oxide represented by $Li_{1+y}V_3O_8$, silver vanadium oxides such as $Ag_2V_4O_{11}$, $TiS_2$, polypyrrole, $MoO_2$, $MoS_2$, $H_2V_3O_8$, metal vanadium oxides represented by $M_zH_{1-z}V_3O_8$, $MnO_2$, $V_2O_5$, and $V_6O_{13}$. In an example, the first active material includes or consists of lithium vanadium oxide represented by $Li_{1+y}V_3O_8$. One example of the lithium vanadium oxide includes $Li_{1.2}V_3O_8$. In the compounds listed above, x can be greater than 0.2, and/or less than 1.2 before the initial discharge of the battery, y can be greater than 0 and/or less than 0.3 before the initial discharge of the battery, z can be greater than zero and/or less than or equal to 1 before discharge of the battery, M represents Na, Mg, Ba, K, Co, Ca and combinations thereof, and M' represents Na, Mg, Ba, K, Co, Ca and combinations thereof.

An example of the cathode medium includes or consists of $CF_x$ as a first active material and lithium vanadium oxide, polypyrrole, $MoO_2$, $MoS_2$ or combinations thereof as a second active material. Another example of the cathode medium includes or consists of $CF_x$ as a first active material and lithium vanadium oxide as a second active material. Yet another example of the cathode medium includes or consists of $CF_x$ as a first active material and silver vanadium oxide as a second active material. Still another example of the cathode medium includes $CuCl_2$, $LiCuCl_2$, $MnO_2$, $V_2O_5$ or combinations thereof as a first active material and lithium vanadium oxide, polypyrrole, $MoO_2$, $MoS_2$ or combinations thereof as a second active material. In some instances, a first active material such as $CF_x$ is not rechargeable. When the first active material is not rechargeable, the battery may function as a primary battery. When the first active material and the second active material are both rechargeable, the battery may function as a secondary battery.

If the cathode active material includes or consist of, one or more first active materials and one or more second active materials, a suitable mass ratios of the one or more first active materials to the one or more second active materials in the cathode include, but are not limited to, ratios greater than 10:90, or greater than 20:80, or greater than 30:70 and/or less than 70:30, or less than 90:10, or less 80:20. Additionally, suitable ratios of the one or more first active materials ratios can be in a range of: 30:70 to 70:30 or 40:60 to 60:40. These ratios may change as function of the battery application. For instance, increased first active material can increase capacity but reduce rate capabilities.

To make a cathode, a mixture of the one or more cathode active materials, binder, conductor, and/or water are mixed together to form a slurry. The slurry is applied to both sides of the cathode substrate and dried. A conductor such as carbon black can then be added and mixed. A binder such as polytrtrafluoroethylene (PTFE) can then be added and mixed. An additional binder such as carboxymethyl cellulose (CMC) in water can be added and mixed to form a slurry having the mass per cents of the one or more first active materials and the one or more second active materials as indicated above. A cathode substrate such as an aluminum substrate is coated with the slurry, dried by evaporation, and then rolled to the desired thickness.

Examples of suitable cathode constructions are set forth in U.S. patent application Ser. No. 10/984,434, filed on Nov. 8, 2004, entitled "Battery Having High Rate and Low Rate/High Capacity Capabilities," and incorporated herein in its entirety.

Figure 2:
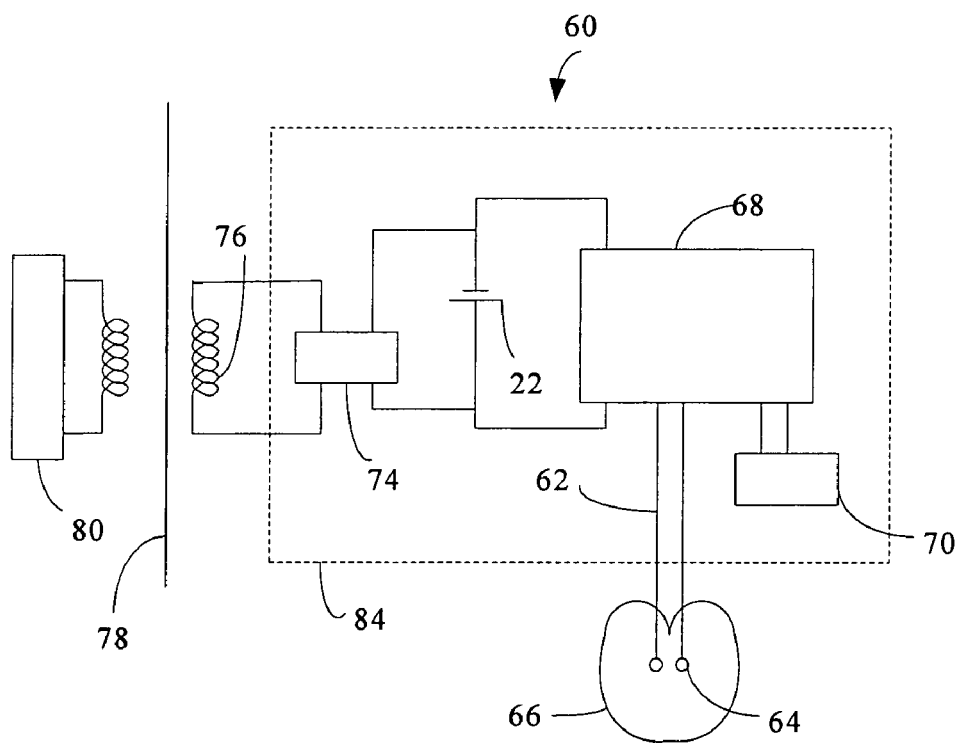
FIG. 2 is a schematic diagram of a defibrillation system that employs the battery.

The battery is suitable for use in a variety of implantable medical devices such as a defibrillator. FIG. 2 is a schematic diagram of a defibrillation system 60 that employs the battery. The defibrillation system 60 includes lead lines 62 connected to electrodes 64 in contact with the heart. Although the defibrillation system 60 is shown with two electrodes 64, the defibrillation system 60 may include three or more electrodes 64 and/or three or more lead lines. The specific positions of the electrodes 64 relative to the heart 66 is dependent upon the requirements of the patient. For instance, the electrodes 64 can be positioned in the superior vena cava and the right ventricle of the heart. Leads may be implanted in other regions of the heart such as the left atrium and left ventricle for therapies such as pacing for congestive heart failure.

The defibrillation system 60 also includes a processing unit 68. The lead lines 62 provide electrical communication between the processing unit 68 and the electrodes 64. The processing unit 68 is also in electrical communication with capacitor circuits 70. The capacitor circuits 70 are in electrical communication with the lead lines 62. The capacitor circuits 70 include one or more capacitors (not shown) for storing energy. The processing unit 68 can cause the one or more capacitors to be discharged such that energy stored in the one or more capacitors is delivered to the heart through all or a portion of the electrodes 64.

A battery 22 provides power to the processing unit 68 and the capacitor circuits 70. The battery 22 is in electrical communication with recharge circuits 74. The recharge circuits 74 are in electrical communication with a coil 76 positioned under the skin 78. The battery 22 can be charged by use of a radio frequency link between an external charger circuit 80 and the implanted recharge circuit 74. During charging of the battery 22 the external charger circuit 80 transmits energy from a coil through the skin 78 where it is received by the implanted coil 76. The implanted coil 76 supplies the energy to the implanted recharge circuit 74. The implanted recharge circuit 74 employs the energy to charge the battery 22.

Suitable processing units 68 can include, but are not limited to, analog electrical circuits, digital electrical circuits, processors, microprocessors, digital signal processors (DSPs), computers, microcomputers, or combinations suitable for performing the monitoring and control functions. In some instances, the processing unit 18 has access to a memory that includes instructions to be executed by the processing unit 18 during performance of the control and monitoring functions.

The processing unit 68, the battery 22, the capacitor circuits 70 and the recharge circuits 74 can be located within a case 84. Although the coil 76 is show as being positioned outside of the case 84, in some instances, the coil 76 can be positioned within the case 84.

During operation of the defibrillation system 60, the defibrillation system 60 employs output from the lead lines 62 to monitor the heart and diagnose when defibrillation shocks should be provided. These monitoring functions generally drain on the order of 10 μA from the battery 22. The defibrillation system 60 can also provide pacing capabilities. The current draw on a battery 22 due to constant pacing can be estimated by assuming that pacing will use 6-V, 500-μs pulses at an impedance of 500Ω at a rate of 70 beats/minute. Under these conditions, the energy drawn from the battery 22 will be about 25 mJ/min, or an average current draw of about 7 μA.

When the processing unit 68 identifies that defibrillation shocks are needed, the processing unit 68 provides the heart with one or more defibrillation shocks. To provide a defibrillation shock, the processing unit 68 employs energy from the battery 22 to charge the one or more capacitors in the capacitor circuits 70. The processing unit 68 causes these capacitors to be discharged such that energy stored in the capacitors is delivered to the heart through all or a portion of the electrodes 64 in the form of defibrillation shocks.

During the defibrillation shocks, the defibrillator requires that one or more pulses be delivered from the battery 22 to the one or more capacitors. Each pulse is generally associated with a defibrillation shock. The duration of each pulse is generally about 8 to 12 seconds with the pulses separated by about 8 to 12 seconds. In a preferred embodiment, each pulse has a duration of about 10 seconds and a separation of about 10 seconds. The defibrillator generally requires that each pulse provide at least 35 J to the one or more capacitors or at least 70 J to the one or more capacitors. In one embodiment, the defibrillator requires that each pulse provide at least 40 J to the one or more capacitors or at least 80 J to the one or more capacitors.

Although FIG. 2 illustrates the defibrillator having a single battery, the defibrillator can include more than one battery. For instance, the defibrillator can include a primary battery in addition to the battery. One battery can be employed to provide the energy needed for monitoring and pacing while another battery can provide energy for the defibrillation shocks.

EXAMPLE 1

Cathodes were generated by mixing $CF_x$ with x=1, $Li_{1+y}V_3O_8$ with y=0.2, carbon black, PTFE and CMC to provide a slurry that was 36 wt % $CF_x$, 54 wt % $Li_{1+y}V_3O_8$, 5 wt % carbon black, 1.67% PTFE and 3.33% CMC. The slurry was coated on 20 um thick aluminum foil cathode substrate. The result was dried and pressed to a 30% to 50% porosity. Anodes were made from 25 μm thick lithium metal (Honjo Metal Co.).

A first electrolyte was prepared by dissolving $LiPF_6$ to 1.2 M in a mixture having a PC:DME volume ratio of 30:70. A second electrolyte was prepared by dissolving LiDfOB to 1.2 M in a mixture having a PC:DME volume ratio of 30:70. A third electrolyte was prepared by dissolving LiDfOB to 0.1 M and $LiPF_6$ to 1.1 M in a mixture having a PC:DME volume ratio of 30:70. Coin cells were prepared by employing each of the electrolytes to activate an anode and a cathode with a Polypropylene separator positioned between the anode and the cathode.

EXAMPLE 2

Figure 3:
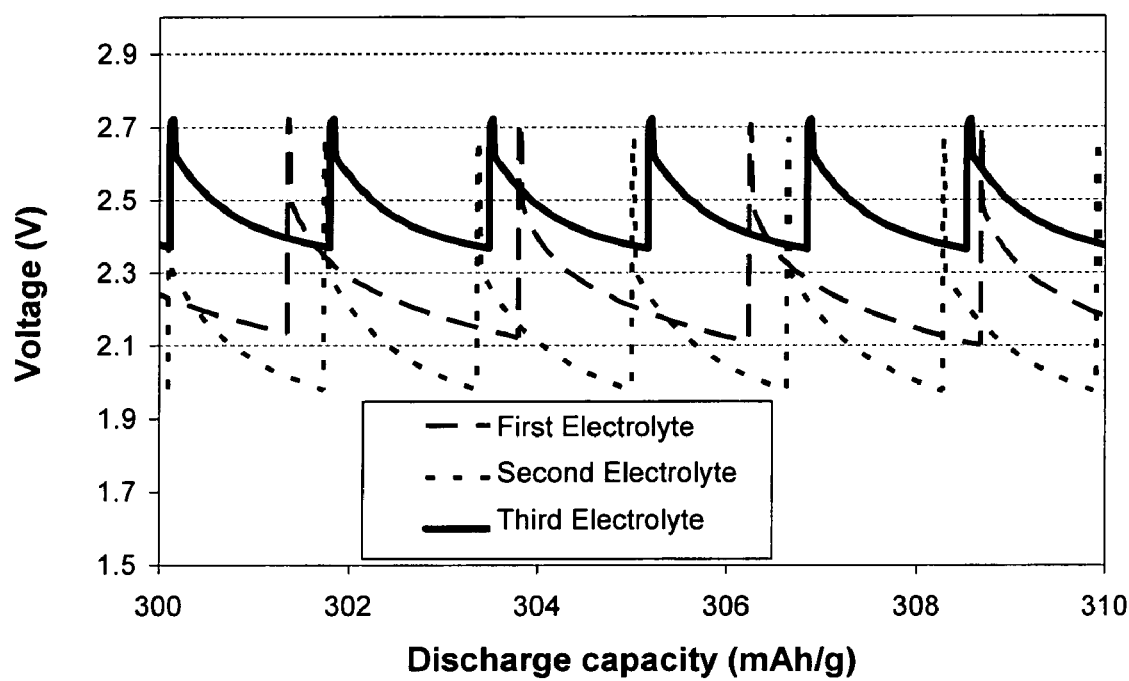
FIG. 3 illustrates the voltage versus discharge capacity performance for different batteries during pulsing after storage at elevated temperatures.

The batteries of Example 1 were tested for their pulsing ability after storage at 50° C. for about 3 weeks. After storage, the batteries were pulsed at about 37° C. to test for ability to discharge pulses. For each pulse, the battery was discharged at 1.5 C. The pulses had durations of 10 seconds and were each separated by a rest of 15 seconds. FIG. 3 provides the results for a battery having the first electrolyte, a battery having the second electrolyte and a battery having the third electrolyte. The battery having the electrolyte with the LiDfOB as an additive (third electrolyte) provided a lower voltage drop than the battery without the LiDfOB (first electrolyte). The battery employing the LiDfOB as a salt showed the largest voltage drop.

EXAMPLE 3

Figure 4:
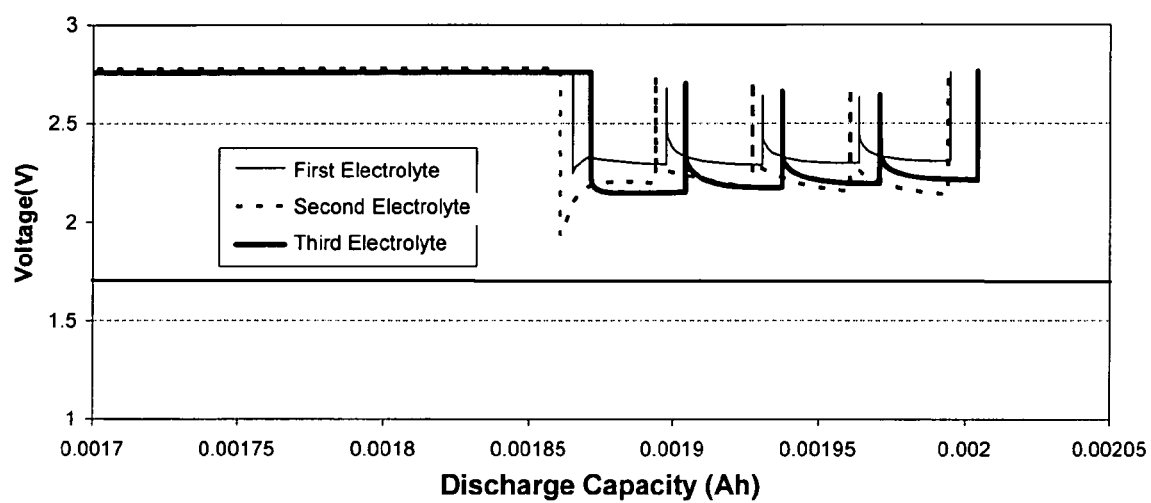
FIG. 4 illustrates the voltage versus discharge capacity performance for different batteries during pulsing after storage.

The batteries of Example 2 were tested for their pulsing ability after slow constant current discharge (C/3 month) at 37° C. After 1 week slow discharge, the batteries were pulsed at about 37° C. to test voltage delay. For each pulse, the battery was discharged at 1.5 C. The pulses had durations of 10 seconds and were each separated by a rest of 15 seconds. FIG. 4 provides the results for a battery having the first electrolyte, a battery having the second electrolyte and a battery having the third electrolyte. The battery having the electrolyte with the LiDfOB as an additive (third electrolyte) doesn't show voltage delay. The battery employing the LiDfOB as a salt showed the largest voltage drop.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A battery, comprising:
an electrolyte including an organoborate additive and one or more salts in a solvent, a molar ratio of the total amount of the one or more salts:the total amount of organoborate additive is in a range of 10:1 to 400:1.

2. The battery of claim 1, wherein the organoborate is present in a concentration less than 0.2 M.

3. The battery of claim 1, wherein the organoborate is selected from the group consisting of lithium bis(oxalato) borate (LiBOB) and lithium difluoro oxalato borate (LiDfOB).

4. The battery of claim 1, wherein the solvent includes one or more Organic solvents.

5. The battery of claim 4, wherein at least one of the organic solvents is selected from the group consisting of tetrahydrofuran (THF), methyl acetate (MA), diglyme, trigylme, tetragylme, dimethyl carbonate (DMC), 1,2-dimethoxyethane (DME), 1,2-diethoxyethane (DEE),1-ethoxy, 2-methoxyethane (EME), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP).

6. The battery of claim 1, wherein the solvent includes
at least one organic solvent selected from the group consisting of tetrahydrofuran (THF), methyl acetate (MA), diglyme, trigylme, tetragylme, dimethyl carbonate (DMC), 1,2-dimethoxyethane (DME),1,2-diethoxyethane (DEE),1-ethoxy, 2-methoxyethane (EME), ethyl methyl carbonate (EMC), methyl propyl carbonate, ethyl propyl carbonate, diethyl carbonate (DEC), and dipropyl carbonate, and
at least one organic solvent selected from the group consisting of propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), and N-methyl-2-pyrrolidone (NMP).

7. The battery of claim 1, wherein the solvent includes
at least one organic solvent selected from the group consisting of linear and cyclic ethers and dialkyl carbonates, and
at least one organic solvent selected from the group consisting of cyclic carbonates, cyclic esters and cyclic amides.

8. The battery of claim 1, wherein the solvent includes two or more organic solvents.

9. The battery of claim 1, wherein at least one of the one or more salts is a lithium salt.

10. The battery of claim 9, wherein the lithium salts in the electrolyte are present in the solvent at a total concentration greater than 4.0 M.

11. The battery of claim 9, wherein at least one of the one or more lithium salts are selected from a group consisting of $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, Li-methide, Li-imide and lithium alkyl fluorophosphates.

12. The battery of claim 1, further comprising one or more anodes and one or more cathodes activated by the electrolyte.

13. The battery of claim 12, wherein the organoborate additive forms a passivation layer on at least one of the one or more cathodes.

14. The battery of claim 12, wherein at least one of the one or more cathodes includes a first active material and a second active material.

15. The battery of claim 14, wherein the second active material is lithium vanadium oxide or silver vanadium oxide.

16. The battery of claim 14, wherein the first active material includes $CF_x$.

17. The battery of claim 16, wherein the second active material includes lithium vanadium oxide.

18. The battery of claim 15, wherein the second active material includes silver vanadium oxide.

19. The battery of claim 1, wherein the organoborate additive is one of a plurality of organoborates included in the electrolyte.

20. The battery of claim 1, wherein the organoborate additive includes one or more organoborates selected from a group consisting of: bis[benzenediolato (2-)-O,O']borate, bis[substituted beazenediolato (2-)-O,O']borate, bis[salicylato]borate, bis[substituted salicylato]borate, bis[2,2'-biphenyldiolato (O,O')]borate, bis[substituted 2,2'-biphenyldiolato (O,O')]borate), bis[oxalato (2-)-O,O']borate, bis[malonato (2-)-O,O']borate, bis[succinato]borate, [α-hydroxy-carboxylato]borate, [α-hydroxy-carboxylato]borate, [β-hydroxy-carboxylato]borate, [β-hydroxy-carboxylato]borate, [α-dicarboxylato]borate, and [α-dicarboxylato]borate.

21. The battery of claim 1, wherein the organoborate additive includes one or more salts according to:

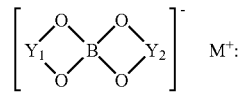 $M^+$:

wherein $M^+$ is a metal ion selected front the Group I or Group II elements; $Y_1$ and $Y_2$ are each selected from a group consisting of: —$CX(CR_2)_aCX$—, —$CZZ'(CR_2)_aCZZ'$—, —$CX(CR_2)_aCZZ'$—, —$SO_2(CR_2)_bSO_2$—, and —$CO(CR_2)_bSO_2$—; X is =O or =NR', Z is alkyl, halogenated alkyl, —C=NR', —$CR'_3$ or R'; Z' is alkyl, halogenated alkyl, —C=NR', $CR'_3$ or R'; R' is halogen or hydrogen; R is hydrogen, alkyl, halogenated alkyl, cyano, or halogen; a is 0 to 4 and b is 1 to 4.

22. The battery of claim 1, wherein the organoborate additive includes one or more salts according to:

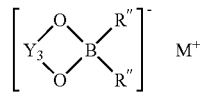 $M^+$ wherein $M^+$ is a metal ion selected from the Group I or Group II elements; $Y_3$ is selected from a group consisting of —$CX(CR_2)_aCX$—, —$CZZ'(CR_2)_aCZZ'$—, —$CX(CR_2)_aCzz'$—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$, or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4.

23. The battery of claim 22, wherein each of the R" is fluoro.

24. A battery, comprising:
an electrolyte including an organoborate and one or more salts in a solvent, the solvent including one or more organic solvents, a molar ratio of the total amount of the one or more salts:the total amount of organoborate is in a range of 10:1 to 400:1.

25. The battery of claim 24, wherein the organoborate is present in a concentration less than 0.2 M.

26. The battery of claim 24, wherein the organoborate is selected from the group consisting of lithium bis(oxalato) borate (LiBOB) and lithium difluoro oxalato borate (LiDfOB).

27. The battery of claim 26, wherein the solvent includes a plurality of organic solvents.

28. The battery of claim 24, wherein at least one of the organic solvents is selected from the group consisting of tetrahydrofuran (THF), methyl acetate (MA), diglyme, trigylme, tetragylme, dimethyl carbonate (DMC), 1,2-dimethoxyethane (DME), 1,2-diethoxyethane (DEE),1-ethoxy, 2-methoxyethane (EME), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP).

29. The battery of claim 24, wherein the solvent includes
at least one organic solvent selected from the group consisting of tetrahydrofuran (THF), methyl acetate (MA), diglyme, trigylme, tetragylme, dimethyl carbonate (DMC), 1,2-dimethoxyethane (DME),1,2-diethoxyethane (DEE),1-ethoxy, 2-methoxyethane (EME), ethyl methyl carbonate (EMC), methyl propyl carbonate, ethyl propyl carbonate, diethyl carbonate (DEC), and dipropyl carbonate, and
at least one organic solvent selected from the group consisting of propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), and N-methyl-2-pyrrolidone (NMP).

30. The battery of claim 24, wherein the solvent includes
at least one organic solvent selected from the group consisting of linear and cyclic ethers and dialkyl carbonates, and
at least one organic solvent selected from the group consisting of cyclic carbonates, cyclic esters and cyclic amides.

31. The battery of claim 24, wherein the solvent includes two or more organic solvents.

32. The battery of claim 31, wherein at least one of the one or more salts is a lithium salt.

33. The battery of claim 32, wherein the lithium salt in the electrolyte are present in the solvent at a total concentration greater than 4 M.

34. The battery of claim 32, wherein at least one of the one or more lithium salts are selected from a group consisting of LiClO$_4$, LiBF$_4$, LiAsF$_6$, LiPF$_6$, LiSbF$_6$, LiCF$_3$SO$_3$, LiC$_6$F$_5$SO$_3$, LiC(CF$_3$SO$_2$)$_3$, LiN(SO$_2$C$_2$F$_5$)$_2$, LiN(SO$_2$CF$_3$)$_2$, LiAlCl$_4$, LiGaCl$_4$, LiSCN, LiO$_2$, LiO$_3$SCF$_3$, LiO$_2$CCF$_3$, LiSO$_6$F, LiB(C$_6$H$_5$)$_4$, Li-methide, Li-imide and lithium alkyl fluorophosphates.

35. The battery of claim 24, further comprising one or more anodes and one or more cathodes activated by the electrolyte.

36. The battery of claim 35, wherein the organoborate forms a passivation layer on at least one of the one or more cathodes.

37. The battery of claim 36, wherein at least one of the one or more cathodes includes a first active material and a second active material.

38. The battery of claim 37, wherein the second active material is lithium vanadium oxide or silver vanadium oxide.

39. The battery of claim 37, wherein the first active material includes CF$_x$.

40. The battery of claim 39, wherein the second active material includes lithium vanadium oxide.

41. The battery of claim 39, wherein the second active material includes silver vanadium oxide.

42. The battery of claim 24, wherein the organoborate is one of a plurality of organoborates included in the electrolyte.

43. The battery of claim 24, wherein the organoborate includes one or more salts selected from a group consisting of: bis[benzenediolato (2-)-O,O']borate, bis[substituted benzenediolaxo (2-)-O,O']borate, bis[salicylato]borate, bis[substituted salicylato]borate, bis[2,2'-biphenyldiolato (O,O')]borate, bis[substituted 2,2'-biphenyldiolato (O,O')]borate), bis[oxalato (2-)-O,O']borate, bis[malonato (2-)-O,O']borate, bis[succinato]borate, [α-hydroxy-carboxylato]borate, [α-hydroxy-carboxylato]borate, [β-hydroxy-carboxylato] borate, [β-hydroxy-carboxylato]borate, [α-dicarboxylato] borate, and [α-dicarboxylato]borate.

44. The battery of claim 24, wherein the organoborate includes one or more salts according to:

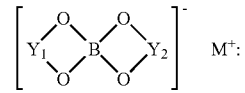

wherein M$^+$ is a metal ion selected from the Group I or Group II elements; Y$_1$ and Y$_2$ are each selected from a group consisting of: —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4.

45. The battery of claim 24, wherein the organoborate includes one or more salts according to:

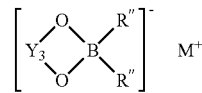

wherein M$^+$ is a metal ion selected from the Group I or Group II elements; Y$_3$ is selected from a group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$, or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4.

46. The battery of claim 45, wherein each of the R" is a fluorine.

47. A defibrillator, comprising:
a battery having an electrolyte that includes an organoborate additive and one or more salts in a solvent, the organoborate additive being present at a concentration less than 0.2 M and a molar ratio of the total amount of the one or more salts:the total amount of organoborate additive is in a range of 10:1 to 400:1;
one or more capacitors configured to store electrical energy from the battery in an amount sufficient to provide one or more defibrillation shocks; and
a processing unit configured to control the storage of electrical energy in the one or more capacitors and to control the discharge of the electrical energy from the one or more capacitors.

48. A defibrillator, comprising:
a battery having an electrolyte that includes an organoborate and one or more salts in a solvent, the solvent including one or more organic solvents and a molar ratio of the total amount of the one or more salts:the total amount of organoborate additive is in a range of 10:1 to 400:1;
one or more capacitors configured to store electrical energy from the battery in an amount sufficient to provide one or more defibrillation shocks; and
a processing unit configured to control the storage of electrical energy in the one or more capacitors and to control the discharge of the electrical energy from the one or more capacitors.

* * * * *